US006772234B1

(12) United States Patent
O'Hare et al.

(10) Patent No.: US 6,772,234 B1
(45) Date of Patent: Aug. 3, 2004

(54) SYSTEM AND METHOD FOR INDICATING THE IMPROPER REMOVAL OF A STORAGE MEDIUM BEFORE COMPLETION OF A WRITE CYCLE

(76) Inventors: Joseph James O'Hare, 760 Farm Rd., Apt. 232, Marlboro, MA (US) 01752; Robert Bruce Stansell, 425 Herndon Dr., Winston-Salem, NC (US) 27104; William Henry Lueckenbach, 350 Saddlebrook Cir., Lewisville, NC (US) 27023

( * ) Notice: Subject to any disclaimer, the term of this patent is extended or adjusted under 35 U.S.C. 154(b) by 0 days.

(21) Appl. No.: 09/307,676

(22) Filed: May 10, 1999

(51) Int. Cl.⁷ .......................... G06F 13/10; G06F 12/00
(52) U.S. Cl. ........................... 710/17; 710/18; 711/115; 713/200
(58) Field of Search .............................. 710/13, 15, 17, 710/18, 102; 711/115, 103, 111; 713/200, 323

(56) References Cited

U.S. PATENT DOCUMENTS

| | | | | |
|---|---|---|---|---|
| 5,399,848 A | * | 3/1995 | Kimura | 235/492 |
| 5,552,776 A | * | 9/1996 | Wade et al. | 340/825.31 |
| 5,721,835 A | * | 2/1998 | Niwa et al. | 710/101 |
| 6,119,237 A | * | 9/2000 | Cho | 713/300 |
| 6,121,967 A | * | 9/2000 | Foster et al. | 345/348 |
| 6,286,079 B1 | * | 9/2001 | Basham et al. | 711/111 |

\* cited by examiner

Primary Examiner—Pierre-Michel Bataille

(57) ABSTRACT

A processing and information storage system having a processor with a communication port, and a removably connectable storage medium connected to the communication port. Control logic is implemented whereby, at the beginning of a write cycle, an information flag is transmitted by the processor for storage in the storage medium. The information desired to be stored in the storage medium is then transmitted by the processor. The control logic then performs a test to determine whether or not the storage medium is still connected to the communication port. If the test indicates that the storage medium is still connected, then the information flag is removed from the storage medium.

19 Claims, 2 Drawing Sheets

SYSTEM AND METHOD FOR INDICATING THE IMPROPER REMOVAL OF A STORAGE MEDIUM BEFORE COMPLETION OF A WRITE CYCLE

BACKGROUND OF THE INVENTION

1. Field of the Invention

The present invention relates to computer and processing systems and removable storage mediums connected thereto.

2. Description of the Prior Art

Computers and processing units generally have internal memory in which information may be stored. However, in order to have enhanced storage capability and to interface with the external environment, computers frequently are connected to removable storage mediums such as PC cards, floppy disks, backup tape, writeable compact disks, and digital video disks (DVD), to name a few. In such a computer system, a storage medium is insertable within a receptacle of the computer where it may receive and store selected information sent to it during a "write cycle" or "write sequence" of the computer. The storage medium may then be removed, after which it can be cataloged in a convenient location or installed in a different computer system wherein the stored information may be downloaded.

A problem exists with the above-identified interface between a computer and a removable storage medium. Occasionally, after a write cycle has begun, an operator of the computer system will improperly remove the storage medium before the write cycle is completed. Such action is very undesirable since some amount of data likely will not have been transmitted from the computer to the storage medium, and data previously stored on the medium may be destroyed. At present, there is no reliable mechanism by which to indicate, in both the computer and the storage medium, when such an improper removal has occurred and the circumstances around such removal. Without such indication means, proper remedial measures are difficult to employ, such as reinserting the storage medium in the particular computer so that the information can be retransmitted, and training the operator to not make the same mistake in the future.

Thus, a processing and information storage system is needed that can sufficiently indicate when an improper removal of the storage medium has occurred and the circumstances around such removal.

SUMMARY OF THE INVENTION

The present invention provides a processing and information storage system and method that meets all of the above-identified needs.

In accordance with the present invention, a processing and information storage system is provided having a processor with a communication port. A removably connectable storage medium is connected to the communication port. Control logic is implemented whereby, at the beginning of a write cycle, an information flag is transmitted by the processor for storage in the storage medium. The information desired to be stored in the storage medium is then transmitted by the processor. The control logic then performs a test to determine whether or not the storage medium is still connected to the communication port. If the test indicates that the storage medium is still connected, then the information flag is removed from the storage medium.

This and other objects and advantages of the present invention will become apparent from a reading of the following description of the preferred embodiment taken in connection with the attached drawings.

DESCRIPTION OF THE PREFERRED EMBODIMENT

Figure 1:
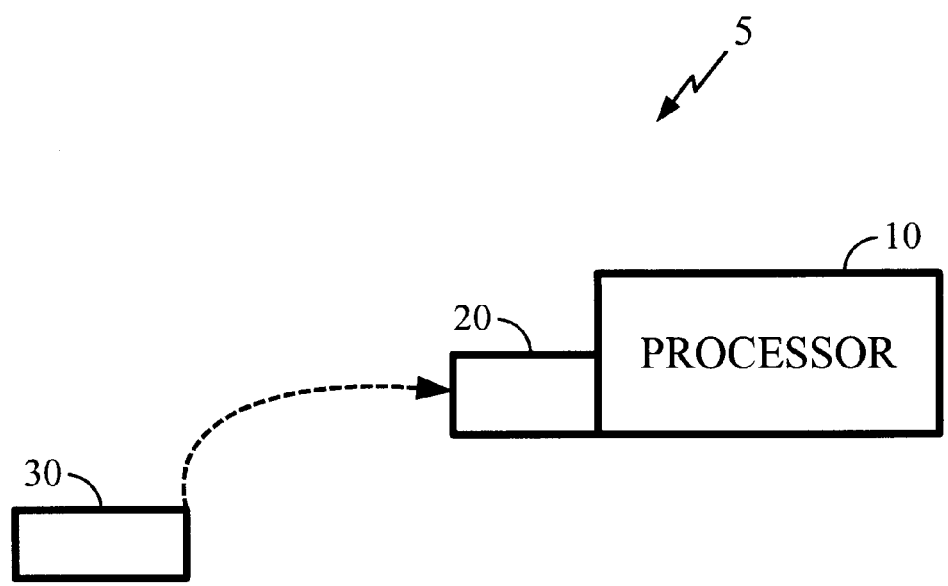
FIG. 1 is a schematic block diagram of a processing and information storage system embodying the present invention.

Referring now to FIG. 1, shown is a processing and information storage system 5 including a computer or processor 10 having a communication port (or media read/write device) 20 electrically connected thereto. Communication port 20 may be an integral part of processor 10, or may be an accessory connectable thereto. Although many types of computers/processors may be implemented, processor 10 is a 386 SX personal computer (PC) and includes a conventional internal memory in the preferred exemplary embodiment. Furthermore, in one exemplary embodiment, processor 10 is incorporated into a vehicle such as a truck whereby it processes and records information generated by the vehicle as it is driven.

Also shown in FIG. 1 is a storage medium 30 that is removably connectable to and interfaces with communication port 20. Medium 30 may be any one of many types of storage mediums, provided that communication port 20 corresponds to and accommodates the desired type. For example, in one embodiment, medium 30 is a writeable compact disk or a DVD, whereby communication port 20 is an optical reader. In another embodiment, medium 30 is a floppy disk, whereby communication port 20 is a magnetic reader (disk drive). In one preferred embodiment, storage medium 30 is a PC card, whereby communication port 20 is a PC card socket. In this one preferred embodiment, the PC card may be a Type I SRAM (Static Random Access Memory) PCMCIA (Personal Computer Memory Card International Association) card, and the PC card socket may be a PCMCIA Release 2.1 Type II Interface.

When removable storage medium 30 is connected to communication port 20, the interface allows communication between processor 10 and medium 30. At appropriate times, processor 10 may, during what is conventionally termed a "write cycle" or "write sequence", transmit information (typically digital) to medium 30 for storage therein. This transmission and storage of information may require several seconds to be completed. The manner of transmission and storage of data during such a write cycle is well known to one of ordinary skill in the art, and typically implements a standard BIOS (Basic Input Output System) function call. The transmission and storage of data may also be implemented in a file Input/Output library, or in an Input/Output subroutine. There are many reasons for the storage of information in storage medium 30, including the freeing-up of processor 10's internal memory (which is frequently limited in size) and the need to conveniently interface with the external environment (by the subsequent removal of storage medium 30 and the downloading and implementation elsewhere of the information stored therein). Of course, the connection of medium 30 to communication port 20 also allows transmission of previously stored data from medium 30 to processor 10, during what is conventionally termed a "read cycle".

As mentioned above, it is very undesirable if, after a write cycle of processor 10 has begun, storage medium 30 is removed from communication port 20 before completion of the write cycle. In such a situation, information may be lost, requiring appropriate remedial measures. Via the implementation of appropriate control logic within processor 10, the present invention provides a convenient and efficient method by which to indicate, in both processor 10 and storage medium 30, when such an improper removal has occurred and the circumstances of such removal.

In basic terms, the control logic of the present invention stores an information flag within storage medium 30 at the beginning of a write cycle. After desired information is then transmitted by processor 10 in an attempt to be stored in medium 30, the control logic determines whether or not medium 30 was removed from communication port 20 during the transmission/storage process. If medium 30 was not removed, then the control logic removes (erases) the information flag from medium 30. Therefore, an improper removal of storage medium 30 is indicated in medium 30 if the information flag is still stored therein after the write cycle has been completed. Furthermore, the control logic of the present invention indicates, in processor 10, an improper removal of medium 30 by storing an error message in the internal memory of processor 10 if it is determined that medium 30 was removed during the write cycle transmission/storage process.

Figure 2:
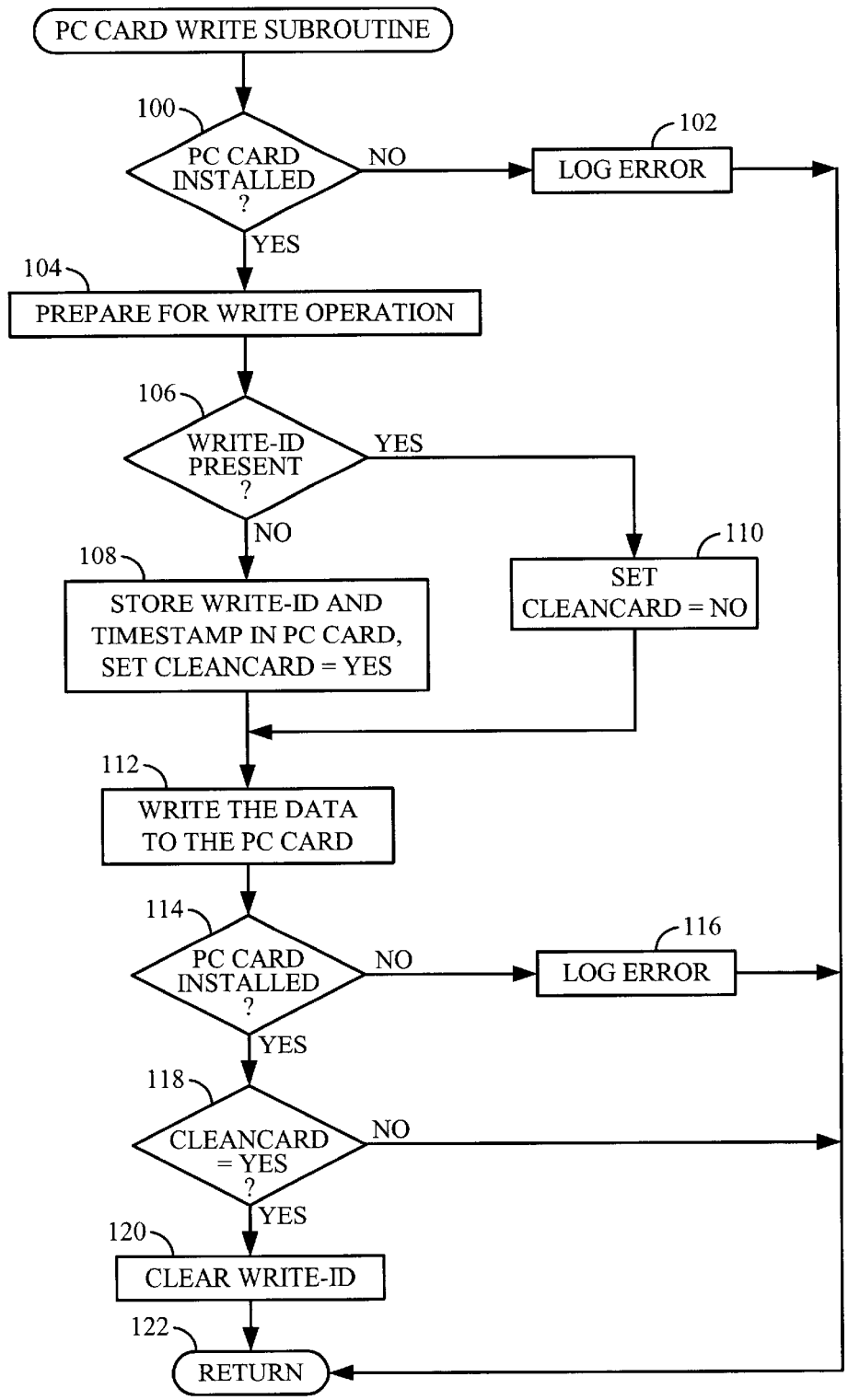
FIG. 2 is a flowchart of the programming logic of the present invention.

Referring now to FIG. 2, shown is a flowchart of a preferred exemplary embodiment of the control logic of the present invention for the write cycle of processor 10. In this particular exemplary embodiment, the write cycle 20 is implemented in a subroutine that is executed whenever it is desirable to store information in storage medium 30.

The subroutine begins with block 100 that determines, in a conventional manner, whether or not storage medium 30 (a PC card in the preferred exemplary embodiment) is connected to communication port 20. If it is not ("NO"), then the subroutine proceeds to block 102 which stores an error message in the internal memory of processor 10, and the subroutine is exited via block 122. This error message may be used by processor 10 to display a message to the operator of the system instructing him or her to insert storage medium 30. If block 100 determines that storage medium 30 is connected to communication port 20 ("YES"), then the subroutine proceeds to block 104. Block 104 prepares for a write operation by performing several conventional preparatory steps, including checking to ensure that the particular storage medium 30 is valid, and reading information from medium 30 to determine the storage format.

Next, the subroutine proceeds to block 106 that determines whether or not a Write-ID is already stored on medium 30. A Write-ID is a block of information (stored in medium 30 during a write cycle by means of block 108) that provides the identification code of the computer or processor that is/was used to store information in medium 30. In this preferred exemplary embodiment, a Write-ID constitutes the information flag that enables the indication, in storage medium 30, of the occurrence of an unsuccessful write cycle (one where medium 30 was improperly removed from communication port 20 before completion of a write cycle). Because the Write-ID is removed from a medium 30 at the conclusion of a successful write cycle (except when a previous unsuccessful write cycle occurred—see below in connection with blocks 118 and 120), the fact that a Write-ID is already stored on medium 30 at the beginning of a write cycle indicates that an unsuccessful write cycle had previously occurred with this particular medium 30. In this situation, desired information preferably is still written to storage medium 30 in the current write cycle (as discussed below), enabling normal operation of system 5 to continue despite the existence of a previous problem. In the preferred embodiment, the information flag (a Write-ID in the exemplary embodiment) is stored in a specially designated write-stamping area of a formatted storage medium 30, preferably in a portion of medium 30 normally reserved for the executable boot code.

If block 106 determines that a previous Write-ID is already stored in medium 30 ("YES"), then the subroutine proceeds to block 110 which sets a temporary variable CleanCard (in the internal memory of processor 10) equal to "NO" in order to indicate that a prior unsuccessful write cycle had occurred. As discussed below, this temporary variable is later used in block 118. After block 110, the subroutine then proceeds to block 112. By bypassing block 108, the subroutine preserves (does not write over) the Write-ID and the TimeStamp (see below in connection with block 108) of the prior unsuccessful write cycle, thereby enabling them to subsequently be used for corrective action.

If, on the other hand, block 106 determines that a Write-ID is not already stored on medium 30 ("NO"), then the subroutine proceeds to block 108. Block 108 stores a Write-ID and a TimeStamp in storage medium 30.

In this situation, the Write-ID is a block of information that provides the identification code of the computer or processor that is used for processor 10. As mentioned above, the Write-ID constitutes the information flag in the exemplary embodiment that enables the indication, in storage medium 30, of the occurrence of an unsuccessful write cycle. A TimeStamp is a block of information identifying the date and time of the present write cycle, and can constitute at least a portion of the information flag in some embodiments. In the preferred embodiment, both the Write-ID and the TimeStamp are stored in the specially designated write-stamping area of storage medium 30 described above. Block 108 also sets temporary variable CleanCard (in the internal memory of processor 10) equal to "YES" in order to indicate that an unsuccessful write cycle had not occurred previously.

Next, the subroutine proceeds to block 112 that writes (or at least attempts to write) the desired information to storage medium 30—the essential goal of the write cycle. After block 112, the subroutine proceeds to block 114 which, like block 100 described above, determines whether or not storage medium 30 is connected to communication port 20. If it is not ("NO"), then storage medium 30 was improperly removed before completion of the write cycle, and the subroutine proceeds to block 116 which stores an error message in the internal memory of processor 10. Preferably, this error message stores the date and time of such improper removal, and, if one exists, the identification code of the storage medium 30. After block 116, the subroutine is then exited via block 122. In this situation, the Write-ID (the information flag in this exemplary embodiment) remains in storage medium 30 so that an unsuccessful write cycle can be indicated therein.

If, on the other hand, block 114 determines that storage medium 30 is still connected to communication port 20 ("YES"), then the subroutine proceeds to block 118. Block 118 determines whether or not temporary variable Clean-Card (in the internal memory of processor 10) is equal to "YES".

If not ("NO"), then it was set equal to "NO" in block 110 in order to indicate that an unsuccessful write cycle had occurred previously, as evidenced by a previous Write-ID already being stored in storage medium 30. In such a situation, even though the present write cycle was successful, it is undesirable to remove the previous Write-ID (the information flag in this exemplary embodiment) from medium 30 so that it can continue in the future to indicate a previous unsuccessful write cycle, thereby preserving the opportunity to perform remedial measures. Therefore, the subroutine bypasses block 120 (discussed below), and proceeds to block 122 whereby the subroutine is exited.

If block 118 determines that temporary variable Clean-Card is equal to "YES", ("YES"), then the subroutine proceeds to block 120 that removes (erases) the Write-ID from storage medium 30, thus indicating the successful completion of the present write cycle and that no previous unsuccessful write cycles occurred. After block 120, the subroutine is exited via block 122.

In the manner described above in connection with the flowchart of FIG. 2, the control logic of the present invention provides a convenient and efficient method by which to indicate, in both processor 10 and storage medium 30, the occurrence of an improper removal of a storage medium 30. If an improper removal has occurred, then an information flag remains in medium 30 to serve as indication of the problem. In the preferred exemplary embodiment described above wherein the information flag consists of a Write-ID, analysis of an improperly removed medium 30 will also identify the processor 10 that was used in the faulty write cycle. Because the TimeStamp of a faulty write cycle remains in medium 30 in the preferred exemplary embodiment, analysis of an improperly removed medium 30 will also provide the date and time of the faulty write cycle. Furthermore, because an error message preferably is stored in processor 10 when a medium 30 is improperly removed, the preferred exemplary embodiment provides the ability to link that processor 10 with the improperly removed medium 30.

By providing a convenient and efficient method by which to indicate, in both processor 10 and storage medium 30, the improper removal of a storage medium 30, appropriate corrective action can subsequently and easily be employed. For example, by linking an improperly removed medium 30 to the processor 10 from which it was removed, the present invention greatly facilitates the pinpointing of the problematic event. The improperly removed medium 30 can then be reinserted into the communication port of the processor so that the information can be retransmitted, after which the information flag would be removed (erased) to indicate that the unsuccessful write cycle was corrected. Furthermore, the pinpointing of the problematic event, especially the date and time thereof, facilitates the identification of the operator who improperly removed the storage medium. That operator can then be trained to not make the same mistake in the future. The pinpointing of the problematic event also enables a correlation to be made between an improper removal and errors induced in other portions of system 5 by the improper removal.

The information flag employed by the present invention can consist of a Write-ID (as in the preferred exemplary embodiment), a TimeStamp, or any other piece of information, or various combinations thereof. Although, as described above, the information flag preferably carries with it substantive information that is useful if storage medium 30 is improperly removed (such as the identification code of the computer or processor, and the date and time of the removal), the information flag may alternatively be much simpler in format. For example, the information flag may be a simple binary flag or bit of information, with a sole purpose of indicating an improper storage medium removal simply by its presence in the storage medium after completion of a write cycle.

Although the preferred embodiment of the present invention has been described with a certain degree of particularity, various changes to form and detail may be made without departing from the spirit and scope of the invention as hereinafter claimed.

We claim:

1. A processing and information storage system comprising:
   a processor having a communication port; and
   a storage medium removably connectable to said communication port for communicating with said processor including receiving and storing desired information during a write cycle of said processor;
   wherein a said write cycle of said processor for storing said desired information in said storage medium comprises the steps of:
   performing a first verification for verifying that said storage medium is connected to said communication port;
   if said first verification is affirmative:
   transmitting an information flag for storage in said storage medium;
   transmitting said desired information for storage in said storage medium;
   performing a second verification for verifying that said storage medium is still connected to said communication port; and
   if said second verification is affirmative, removing said information flag from said storage medium.

2. The system as defined in claim 1 wherein said processor includes a memory, and wherein said processor stores a first error message in said memory if said first verification is negative.

3. The system as defined in claim 1 wherein said processor includes a memory, and wherein said processor stores a second error message in said memory if said second verification is negative.

4. The system as defined in claim 1 wherein said information flag includes identification information of said processor.

5. The system as defined in claim 1 wherein said information flag includes the date and time of said write cycle.

6. The system as defined in claim 1 wherein said storage medium is a PC card and said communication port is a PC card socket.

7. The system as defined in claim 1 wherein said storage medium is a floppy disk and said communication port is a magnetic disk drive.

8. The system as defined in claim 1 wherein said step of transmitting an information flag and said step of removing said information flag are performed only if a said information flag from a previous one of said write cycles is not already stored in said storage medium.

9. The system as defined in claim 1 wherein said processor is a 386 SX.

10. A processing and information storage system comprising:
    a processor having a communication port; and
    a storage medium removably connected to said communication port for communicating with said processor including receiving and storing desired information during a write cycle of said processor;
    wherein a said write cycle of said processor for storing said desired information in said storage medium comprises the steps of:
    transmitting an information flag for storage in said storage medium;

transmitting said desired information for storage in said storage medium;

determining whether or not said storage medium is still connected to said communication port; and if said storage medium is still connected, removing said information flag from said storage medium.

11. In a processing and information storage system including a processor with a communication port and a storage medium removably connectable to said communication port, a method for executing a write cycle of said processor for storing desired information in said storage medium, the method comprising the steps of:

performing a first verification for verifying that said storage medium is connected to said communication port;

if said first verification is affirmative:

transmitting an information flag for storage in said storage medium;

transmitting said desired information for storage in said storage medium;

performing a second verification for verifying that said storage medium is still connected to said communication port; and if said second verification is affirmative, removing said information flag from said storage medium.

12. The method as defined in claim 11 wherein said processor includes a memory, and wherein said processor stores a first error message in said memory if said first verification is negative.

13. The method as defined in claim 11 wherein said processor includes a memory, and wherein said processor stores a second error message in said memory if said second verification is negative.

14. The method as defined in claim 11 wherein said information flag includes identification information of said processor.

15. The method as defined in claim 11 wherein said information flag includes the date and time of said write cycle.

16. The method as defined in claim 11 wherein said storage medium is a PC card and said communication port is a PC card socket.

17. The method as defined in claim 11 wherein said storage medium is a floppy disk and said communication port is a magnetic disk drive.

18. The method as defined in claim 11 wherein said step of transmitting an information flag and said step of removing said information flag are performed only if a said information flag from a previous one of said write cycles is not already stored in said storage medium.

19. The method as defined in claim 11 wherein said processor is a 386 SX.

* * * * *